:::
United States Patent Office 3,275,715
Patented Sept. 27, 1966

3,275,715
PROCESS FOR INCORPORATING ADDITIVES INTO POLYOLEFINS
John M. O'Leary, Jr., Wilmington, Del., assignor, by mesne assignments, to Container Corporation of America, Chicago, Ill., a corporation of Delaware
No Drawing. Filed Dec. 4, 1962, Ser. No. 242,102
8 Claims. (Cl. 260—889)

The present invention is directed to a process for modifying polyolefins.

It is frequently desired to add an additive to a polyolefin, such as an antioxidant, or an ultraviolet inhibitor, or an elastomeric agent, or the like. These materials are frequently solids. It has proven to be difficult to incorporate these materials into polyolefins.

Thus, commercially, two techniques are presently being used. In the first technique, the polyolefin is dry tumbled with the additive. This has proven to be undesirable because of the extreme time necessary to achieve an adequate dispersion. Furthermore, in the case of volatile additives, there is the distinct possibility of loss due to volatilization in the subsequent extrusion step necessary to pelletize the polyolefins into the form in which they are commercially marketed. The second commercial method is the use of low boiling polar-type solvents, such as acetone, methyl-ethyl ketone, methanol, ethanol, etc. In this method the additive is dissolved in the solvent, and the solvent and the polyolefin are tumbled together. The solvent is then flashed off. This method has proven to be not altogether satisfactory because of the fire hazard involved in recapturing solvents having a low flash point, the inability to reclaim amounts of solvent, and more seriously the inefficiency of an adequate dispersion. Thus, when the solvent is flashed off, the additive is left as a discrete particle, and is not uniformly dispersed onto the polyolefin.

This invention is directed to a novel method for introducing an additive to a polyolefin.

This invention has as another object the provision of a novel method in which an additive may be uniformly dispersed within solid polyolefin powder.

This invention has as still another object the provision of a method in which polyolefin powder may be blended with an additive and then directly extruded into pellets.

Other objects will appear hereinafter.

I have discovered that a substantially large number of relatively high boiling solvents will penetrate into a polyolefin powder and cause the same to swell, without coagulating the powder. Thus, I have discovered that an additive may be introduced into polyethylene or into polypropylene by contacting the powdered polyethylene or polypropylene with a solvent containing the additive in solution at a temperature of between 125° F. to 150° F., under conditions where the polyolefin powder swells but does not coalesce. I have found that in this manner the additive may be incorporated into the polyolefin uniformly.

I have discovered that by mixing the polyolefin with the solution at a temperature of between 125° F. and 150° F. coagulation may be avoided if the amount of solution is kept below that which will result in an appreciable dissolving of the polyolefin.

Thus, I have found that with soluble additives, from one-half to one liter of the solution is adequate for 100 pounds of polyolefin powder. Increasing the amount of solution above this value serves no useful purpose and should be avoided. With difficultly soluble materials, such as the incorporation of butyl rubber, buna rubber, ethylene-propylene copolymer (having from 60–75 mol percent of ethylene), larger concentrations of the solvent are advisable. However, in all cases the concentration of the solvent should be below that which produces an appreciable amount of dissolving of the polyolefin. Since the polyolefins are relatively difficult to dissolve in most solvents, being soluble to the extent of between about 0.1 gram to 1 gram per 10 cc. of solvent, as a practical matter the solvents need never be present to the extent in which any appreciable amount of the polyolefin is dissolved.

Since the method of my invention is more rapid than that of any method used to date, and is conducted at relatively low temperatures, the extensive degree of degradation of the additive and/or polyolefin encountered with prior methods for incorporating additives into polyolefins is avoided.

The solvents used in the method of the present invention should be relatively high boiling organic liquids which swell powdered polyethylene or powdered polypropylene. The exact nature of the solvent will depend upon the additive, since it will be necessary for the additive to be dissolved in the solvent. However, a large number of solvents which swell powdered polyethylene and powdered polypropylene are known, and no chemical skill is required in the selection of a suitable one. By way of example, suitable solvents include propyl bromide, amyl chloride, ethylene chloride, carbon tetrachloride, trichlorethylene, tetrachlorethane, a wide variety of aliphatic and cycloaliphatic mixtures such as containing hexanes through decanes, decalin, benzene, toluene, the xylenes, mesitylene, ethylbenzene, etc.

The additives which may be used in the process of my invention comprise any of the large number of commercially available additives for polyethylene or polypropylene, which are soluble in the aforesaid solvents. As examples of suitable additives may be mentioned the following:

Antioxidants such as dilauryl thiodipropionate, distearyl thiodipropionate, butylated hydroxytoluene, 6-tertiary butyl metacresol, 2,6-di-tertiary butyl 4-methylphenol, bislauryl thiodipropionate, trisnonyl phenyl phosphite, phenylnaphthyl-amine, diphenyl-p-phenylene-diamine, dinaphthyl-p-phenylene-diamine, 2,6 - ditertiary butyl-p-cresol, N,N'-diphenyl-p-phenylene-diamine, 4,4'-thio bis (6-tertiary-butyl-m-cresol), and N-stearoyl-p-aminophenol.

Ultraviolet inhibitors including any of the wide variety of commercially available solid inhibitors such as DOBP or OPS, DOBP being 4-dodecyloxy-2-hydroxy-benzophenone, OPS being p-octylphenyl salicylate.

Elastomers such as polyisobutylene, butyl rubber, ethylene-propylene copolymer having from 60 to 75 mol percent of ethylene, ethylene-ethyl acrylate copolymer, polybutadiene, butadiene acrylonitrile, butadiene rubber, etc.

In order to illustrate the subject invention, there are set forth the following examples. However, these examples are by way of illustration and not by way of limitation, and one having ordinary skill in the art can readily modify the examples within the parameters heretofore set forth:

Example 1

227 grams of butylated hydroxytoluene were dissolved in one-half liter of toluene and the solution was dry tumbled with 100 pounds of polyethylene powder for 2 hours at a temperature of 145° F. This resulted in the uniform introduction of the antioxidant into the polyethylene, and a resultant more stable polyethylene than could be obtained by tumbling the polyethylene powder with the butylated hydroxytoluene.

The toluene could be recovered from the polyethylene during the subsequent extrusion stage in which the polyethylene was extruded into pellets. However, no serious disadvantage resulted from permitting the toluene to remain within the polyethylene.

*Example II*

340 grams of butylated hydroxyanisole were dissolved in three-fourths liter of trichlorethylene, and the same were blended with 100 pounds of polypropylene in a Banbury mixer for five minutes with the temperature being maintained at 150° F.

*Example III*

120 grams of 6-tertiary butyl metacresol were dissolved in 1 liter of decalin, and the solution was mixed with polyethylene powder in a Banbury mixer for five minutes with the temperature being maintained at 135° F.

*Example IV*

454 grams of dilauryl thiodipropionate were dissolved in a mixture of 50 weight percent of benzene and 50 weight percent of ortho xylene, and the solution was blended by dry tumbling with 100 pounds of polypropylene at 140° F. for five minutes.

*Example V*

227 grams of distearyl thiodipropionate were dissolved in one-half liter of cyclohexane and the solution was blended, using a Lightning mixer, into 100 pounds of polyethylene powder at a temperature of 130° F. for ten minutes.

*Example VI*

400 grams of distearyl thiodipropionate were dissolved in one-half liter of carbon tetrachloride, and the solution was blended into 100 pounds of polypropylene powder at a temperature of 140° F. in a Banbury mixer for two minutes.

*Example VII*

500 grams of OPS inhibitor were dissolved in one liter of decalin, and the solution was blended into 100 pounds of polypropylene powder at 140° F. in a Banbury mixer for five minutes.

*Example VIII*

500 grams of DOBP ultraviolet inhibitor were dissolved in one-half liter of methylene chloride and the solution was blended with 100 pounds of powdered polyethylene at 125° F. in a Banbury mixer for five minutes.

The process of the present invention is broadly applicable to all of the commercially available powdered polyethylenes and polypropylenes. Thus, I have effected the method of the present invention with a wide variety of low density and high density polyethylenes and a wide variety of polypropylenes. Thus, I have found the method of the present invention to be broadly applicable to all of the powdered polyethylenes and polypropylenes which I have tested, ranging from polyethylenes having a density of 0.915 to an excess of 0.96, and polypropylenes having a melt index at 230° C. of between 1.5 and 12.0.

As indicated in Example I, the solvent may be recovered in the extrusion stage by capturing the solvent from the vent. However, particularly where relatively low concentrations of solvent are required, there is no noticeable adverse effect from permitting the minor amount of solvent added by the method of the present invention to remain within the polyethylene or polypropylene.

I have conducted comparison tests in which I have compared the efficacy of equivalent amounts of antioxidant and/or ultraviolet inhibitor added by the method of the present invention with blends achieved by dry tumbling and by solvent deposition with flashing of the solvent. The blends achieved by the method of the present invention are superior. I attribute this superiority to at least two reasons, namely the more uniform distribution of the additive within the powdered polyethylene or polypropylene, and the less rigorous conditions required to effect such distribution.

Thus, in tests involving the addition of antioxidants, even when the mixing was carried on for an equivalent amount of time as was required to effect dry blending or flash solvent addition, the extent of discoloration due to oxidation of the final polyolefin was either less or altogether absent when the process of the present invention was used. I attribute this to the rapid and uniform penetration of the antioxidant pursuant to the method of the present invention.

The method of the present invention permits the polyethylene and polypropylene to be added to a conventional extruder in the form of powder. However, it is to be understood that other conventional processing equipment may be used to process the polyethylene and polypropylene compositions of the present invention subsequent to the addition of the additive pursuant to the present invention.

The present invention may be embodied in other specific forms without departing from the spirit or essential attributes thereof and, accordingly, reference should be made to the appended claims, rather than to the foregoing specification as indicating the scope of the invention.

I claim:

1. A process for uniformly incorporating a non-gaseous additive into a polyolefin selected from the group consisting of polyethylene and polypropylene which comprises agitating for not more than two hours the powdered polyolefin at a temperature of between 125° F. and 150° F. with a solution of the additive in a solvent which is both a solvent for the additive and which penetrates the polyolefin powder granules and causes them to swell, and with the concentration of said solvent being below that concentration which appreciably dissolves the powdered polyolefin and effects coalescence thereof, namely within the range of ½ to 1 liter of the solution of the solvent and additive per 100 pounds of the polyolefin.

2. A process in accordance with claim 1 in which the polyolefin containing the additive and solvent is subsequently subjected to working in an extruder.

3. A process in accordance with claim 2 in which the solvent is separated from the polyolefin while it is being worked in the extruder.

4. A process in accordance with claim 1 in which the additive constitutes an antioxidant.

5. A process in accordance with claim 1 in which the additive constitutes an ultraviolet inhibitor.

6. A process in accordance with claim 1 in which the additive constitutes an elastomer.

7. A process in accordance with claim 1 in which the solvent constitutes a chlorinated hydrocarbon.

8. A process in accordance with claim 1 in which the solvent constitutes an aliphatic hydrocarbon.

References Cited by the Examiner

UNITED STATES PATENTS

| | | | |
|---|---|---|---|
| 2,120,931 | 6/1938 | Cox et al. | 260—34.2 |
| 2,829,118 | 4/1958 | Wehr | 260—33.8 |
| 3,201,368 | 8/1965 | Fuchsman | 260—45.95 |

MURRAY TILLMAN, *Primary Examiner.*

G. F. LESMES, *Assistant Examiner.*